Figures 3, 4:
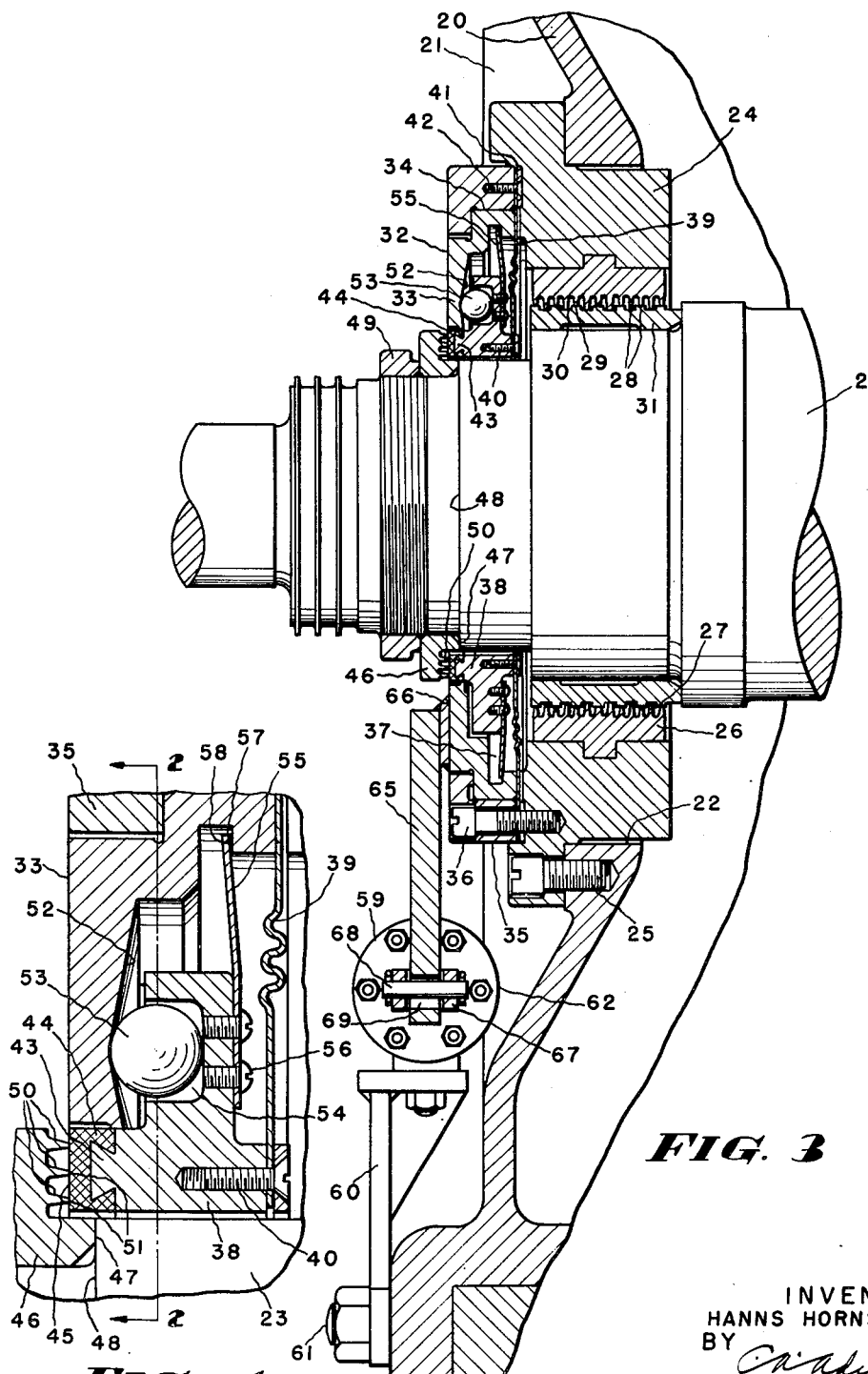

April 19, 1955
H. HORNSCHUCH
2,706,651
SEALING DEVICE FOR THE SHAFTS
OF CENTRIFUGAL BLOWERS
Filed June 7, 1952
2 Sheets-Sheet 1
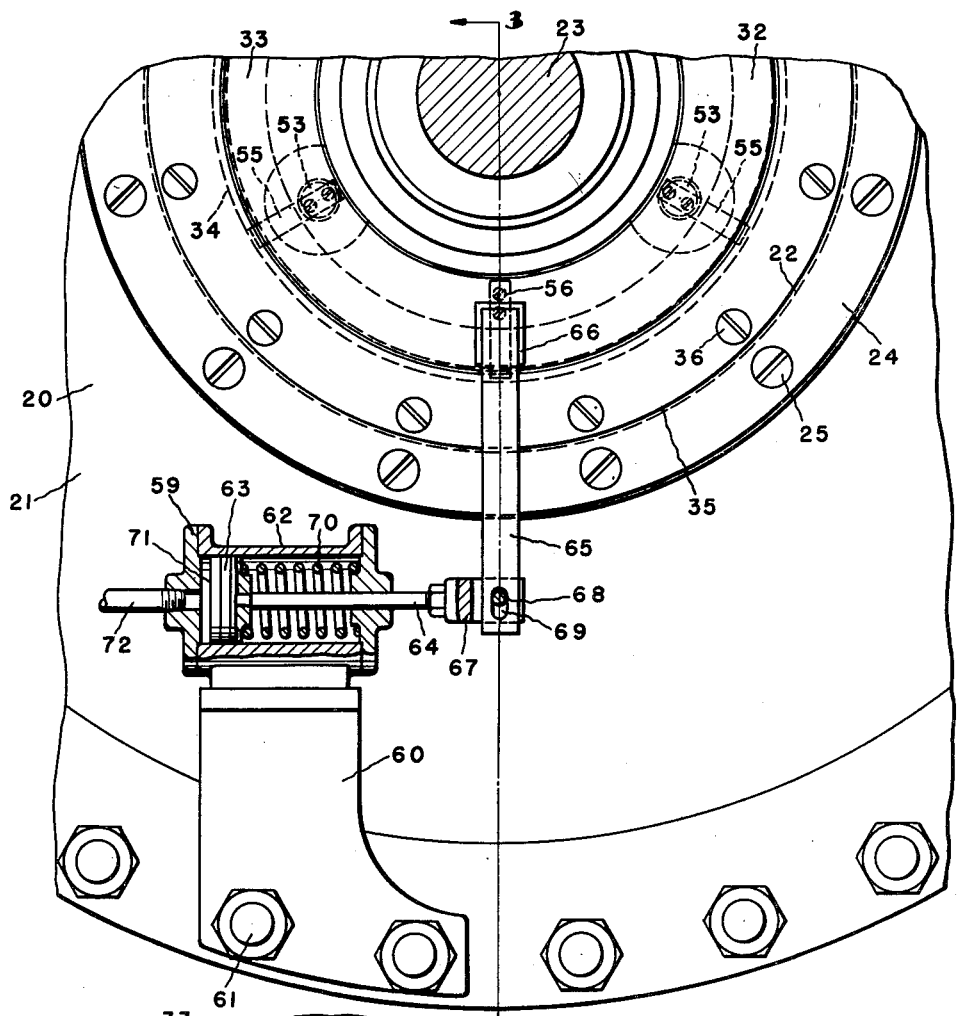
FIG. 1
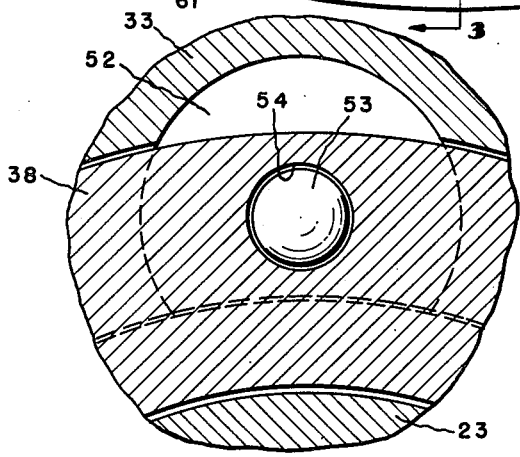
FIG. 2
INVENTOR
HANNS HORNSCHUCH
BY 
HIS ATTORNEY April 19, 1955

H. HORNSCHUCH 2,706,651

SEALING DEVICE FOR THE SHAFTS
OF CENTRIFUGAL BLOWERS

Filed June 7, 1952

2 Sheets-Sheet 2

INVENTOR
HANNS HORNSCHUCH
BY
HIS ATTORNEY

United States Patent Office 2,706,651
Patented Apr. 19, 1955

2,706,651

SEALING DEVICE FOR THE SHAFTS OF CENTRIFUGAL BLOWERS

Hanns Hornschuch, Easton, Pa., assignor to Ingersoll-Rand Company, New York, N. Y., a corporation of New Jersey Application June 7, 1952, Serial No. 292,228

1 Claim. (Cl. 286—11)

This invention relates to sealing devices, and more particularly to a sealing device intended for effecting a seal at the point at which a shaft projects from a blower casing.

It is at this point that difficulty is often experienced in maintaining an effective seal. Normally when the blower is in operation, any leakage that may occur along the shaft will be from the atmosphere into the blower. However, when the blower comes to rest the pressure of the gaseous medium within the blower immediately tends to rise, frequently above atmospheric, and gas will then leak through the same flow path to the atmosphere. In many instances this is highly objectionable, particularly if the gas is of a poisonous nature or has an obnoxious odor. In view of the above stated circumstances it is contemplated herein to equip the blower with a sealing device having relatively rotary components which are held in non-contacting relation to each other during the operating periods of the blower and are brought into sealing relationship only when the blower is at rest.

Another object of the invention is to assure a true and effective sealing engagement between the sealing components.

A more specific object is to prevent subjecting the sealing components to unnecessary wear.

Other objects will be in part obvious and in part pointed out hereinafter.

In the drawings accompanying this specification and in which similar reference numerals refer to similar parts, Figure 1 is an end view, partly broken away, of a centrifugal blower equipped with a sealing device constructed in accordance with the practice of the invention, Figure 2 is a transverse view taken through Figure 4 on the line 2—2, Figure 3 is a similar view taken through Figure 1 on the line 3—3 looking in the direction indicated by the arrows, and Figure 4 is an enlarged view, in elevation and partly broken away, of a portion of the sealing device.

Referring more particularly to the drawings, 20 designates a wall of a centrifugal blower casing 21 only an end portion of which is shown to illustrate a practical application of the invention. Within the wall 20 is a bore 22 to receive the shaft 23 of the blower, and said bore 22 is of sufficiently larger diameter than the shaft 23 to accommodate between them an annular retainer 24 which is secured to the wall 20 by bolts 25. The retainer 24 contains a ring 26 which is interlockingly connected to the retainer and grooved internally to provide a series of annular ribs 27 that collectively constitute a labyrinth. The ribs cooperate at their free end surfaces 28 with the opposed surfaces of alternately arranged ribs 29 and grooves 30 on the peripheral surface of a sleeve 31 carried by the shaft 23 to minimize the leakage of fluid through the labyrinth.

The sealing device, constructed in accordance with the practice of the invention, and designated in general by 32, is disposed at the outer side of the retainer 24. It is partly encased by an annular plate 33 which encircles the shaft 23 and has an annular flange 34 on its periphery that slides rotatively within a ring 35 secured to the retainer 24 by bolts 36.

The ends of the plate 33 lie flush with the ends of the ring 35 and the plate 33 is recessed on the side confronting the retainer 24 to provide a chamber 37 which contains an annular carrier 38 that lies within the confines of the ring 35 and encircles the shaft 23 and is held suspended in the chamber 37 for movement axially of the shaft by a thin, flexible annular plate or diaphragm 39. The plate 39 is secured, in fluid tight relationship, to the inner marginal portion of the carrier by screws 40 and is clamped, in like manner, at its outer marginal portion, between the retaining ring 35 and a clamping ring 41 secured to the ring 35 by screws 42.

On the outer surface of the carrier 38, immediately adjacent its bore, is a circular rib 43 of dove-tail shape for interlocking engagement with an annular sealing member 44, the outer plane surface of which constitutes a sealing surface 45 for cooperation with a sealing element 46 on the shaft 23 to prevent leakage of gas along the shaft to the atmosphere. The element 46 is in the form of a ring that seats at an end 47 against a shoulder 48 on the shaft 23 and is held firmly thereagainst by a nut 49 threaded onto the shaft. On the side of the sealing element 46 adjacent the sealing member 44 are a group of annular ribs 50 which are arranged concentrically with respect to each other and the outer end surfaces 51 of which constitute sealing surfaces intended for engagement with the sealing surface 45.

The plate 33 is rotatable within the retainer ring 35 and such movement of the plate serves to shift the sealing member 44 with respect to the sealing surfaces 51. To this end the plate 33 is provided, on its inner surface, with a plurality of cam surfaces 52, three for example, for engagement with cam followers 53 shown as being in the form of balls that lie loosely within sockets 54 in the opposed surface of the carrier 38. The cam surfaces 52 are preferably of coniform shape, as for example the bottom surfaces of depressions, such as may be conveniently made with a drill point.

The cam followers 53 are constantly maintained in engagement with the cam surface 52 and with the bottoms of the sockets 54 by spring fingers 55 that radiate from the carrier 38 to which they are secured by screws 56 and seat with their outer free ends 57 against a shoulder, or shoulders, 58 in the plate 33. The spring fingers 55 are initially flexed to constantly maintain the cam followers in firm engagement with the cam surfaces and with the bottoms of the sockets 54.

The device serving to rotate the actuator 32 for causing axial movement of the sealing member 44, and designated 59, is mounted upon a bracket 60 secured to the exterior of the casing 21 by bolts 61. It comprises a cylinder 62 and a piston 63 reciprocable therein. A rod 64 on the piston projects from an end of the cylinder 62 for connection with an arm 65 secured, as by welding 66, to the plate 33. The means connecting the rod 64 to the arm 65 preferably consists of a clevis 67 affixed to the rod 64, with the pin 68 of the clevis extending through an aperture 69 in the end portion of the arm 65 and said aperture is of oblong shape to permit of free angular movement of the arm relatively to the rod 64.

A compression spring 70 encircling the rod 64 and acting against the piston 63 and the end of the cylinder tends constantly to position the piston and, therefore, the plate 33 such wise that the lowermost portions of the cam surfaces 52 will be aligned with the cam followers 53 so that the spring fingers 55 may press the sealing member 44 against the sealing surfaces 51.

The opposite end of the piston 63 constitutes a pressure surface 71 against which fluid pressure acts for rotating the actuator in the direction required to lift the cam followers 53 and thereby move the sealing member 44 out of engagement with the sealing surfaces 51. The pressure fluid serving to thus actuate the piston 63 is conveyed into the cylinder 62 by a conduit 72 which preferably leads from the pressure lubricating system of the blower in order that pressure capable of overcoming the spring 70 will be present in the cylinder 62 only during the operative periods of the blower.

The operation of the device is as follows: During the time the shaft 23 is at rest and at which time the pressure in the lubricating system of the blower is either of zero value or too low to overcome the force exerted by the spring 62, the said spring will retain the piston 63 and, therefore, the carrier 38 in such a position that the lowermost points of the cam surfaces 52 will be in alignment with the cam followers 53. In this position of the parts, the springs 55 will press the sealing member 44 into sealing engagement with the outer surfaces 51 of the annular ribs 50 and thereby seal the interior of the blower from the atmosphere.

The sealing member 44 will remain in the sealing position as long as the blower remains at rest, and when the blower is again set in operation the pressure in the lubricating system will rise to a value capable of overcoming the spring 62 and shift the piston 63, thereby causing rotation of the plate 33. Such movement of the plate will slide the cam surfaces 52 beneath the followers 53 and push the sealing member 44 out of engagement with the surfaces 51 and hold it thus throughout the entire operative period of the blower.

When the blower again comes to rest, and in consequence of which the pressure of the fluid acting against the surface 71 of the piston 63 will fall below the force exerted by the spring 70, the said spring will rotate the plate 33 to the position in which the low points of the cam surfaces 52 are in alignment with the cam followers 53. The spring fingers 55, augmented by the pressure of gas acting against the inner surface of the diaphragm 39, will then again press the sealing member 44 against the sealing surfaces 51 and maintain it thus until the fluid pressure within the cylinder 62 again rises to a value capable of shifting the sealing member 44 to the non-sealing position.

As will be readily appreciated from the foregoing description, by thus disengaging the non-rotative sealing member 44 from the rotating sealing surfaces 51 throughout the operative period of the blower these important elements will be protected against wear and will retain their initial sealing form through long periods of service. A further desirable advantage of the invention is that all of the parts relied upon for effecting the action of the movable sealing component are fully encased and, therefore, protected from dust and dirt which might otherwise interfere with their efficient action.

I claim:

1. A sealing device for a centrifugal blower having a shaft to be sealed and a hollow casing through which the shaft extends, comprising a ring secured to the end of the casing, a carrier lying within the confines of the ring encircling the shaft and out of contact therewith and having a sealing surface facing away from said casing, a diaphragm attached to the ring and said carrier to permit said carrier to move axially with respect to the shaft, a ring on said shaft having a sealing surface facing the casing and cooperating with the first said sealing surface, a spring urging the carrier to contact the ring on said shaft, cam operative means to overcome the pressure of said spring including a plate rotatable within and having its ends flush with the ends of the first said ring, balls positioned between the plate and the carrier, said plate having tapered depressions receiving said balls, and an arm to actuate said rotatable plate.

References Cited in the file of this patent

UNITED STATES PATENTS

| | | |
|---|---|---|
| 1,273,648 | Nachenius | July 23, 1918 |
| 1,780,248 | Spreen | Nov. 4, 1930 |
| 1,789,329 | Wolf | Jan. 20, 1931 |
| 1,972,077 | Eberhard | Sept. 4, 1934 |
| 2,096,899 | Hornschuch | Oct. 26, 1937 |
| 2,163,153 | Peterson | June 20, 1939 |
| 2,195,496 | Reed | Apr. 2, 1940 |
| 2,446,138 | Lambert | July 27, 1948 |
| 2,485,741 | King | Oct. 25, 1949 |
| 2,498,739 | Magnesen | Feb. 28, 1950 |
| 2,643,141 | Bryant | June 23, 1953 |